United States Patent Office 3,483,731
Patented Dec. 16, 1969

1

3,483,731
TRACE COMPONENT CHROMATOGRAPHY
Richard A. Sanford and Buell O. Ayers, Bartlesville,
Okla., assignors to Phillips Petroleum Company, a corporation of Delaware
Filed Dec. 12, 1966, Ser. No. 601,095
Int. Cl. G01n 31/08
U.S. Cl. 73—23.1                               6 Claims

ABSTRACT OF THE DISCLOSURE

In order to determine the amounts of trace components present in a chromatographic sample, the trace components are concentrated by adsorption of the main components in a precisely measured amount of sample or by displacement of adsorbed trace components by a precisely measured amount of displacer material, and the amount of said trace components present is then detected.

---

Figure 1:
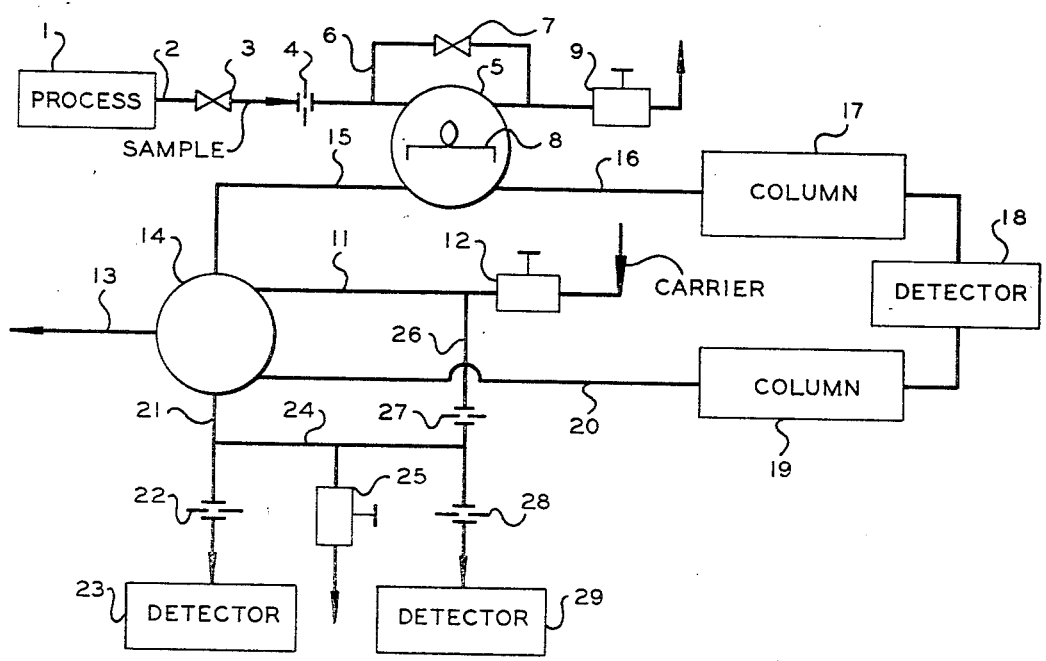

This invention relates to chromatography. In another aspect, this invention relates to an improved method of and apparatus for detecting trace components in a fluid stream.

The present methods of chromatographic analysis of a sample stream include elution analysis, displacement analysis, and frontal development analysis. While these methods are generally satisfactory for the analysis of major components of fluid mixtures present in relatively large concentrations therein, such methods are often unsatisfactory where it is desired to accurately analyze trace components present in very small concentrations due to inherent limitations in the above methods. For example, problems have occurred when using the above methods for detecting trace components within a fluid stream caused by the detecting mechanisms not being sensitive enough to detect trace components in a conventional sample volume which ranges from 0.1 to 3.0 cubic centimeters. Consequently, when analyzing these trace components, it is normally necessary to pass a very large sample (100 to 1000 cc.) through a chromatographic column, the sample constituents therein being sorbed by the column and becoming concentrated therein. Then the concentrated trace components are flushed through the column by a carrier gas stream and passed through a detecting zone wherein the relative concentrations of the sample components in the carrier gas stream are measured. However, if the original sample run through the chromatographic column was not accurately measured, the measure of concentration of trace components within the carrier gas stream to the detecting zone has little analytical value.

Therefore, when analyzing a vaporous sample, the amount of trace components varies as the volume of the vaporous sample varies substantially with the temperature and pressure of the sample volume, and it is generally difficult to obtain well calculated and reproducible sample volumes. For example, when trapping a vaporous sample in a large sample loop from a continuous sample stream run through the loop at process pressure, the sample valve will simultaneously plug the inlet and outlet ports into and from the sample loop to thereby trap a sample within the sample loop at process pressure. Many times, however, the inlet and outlet ports on any one particular sample valve will not close simultaneously. Therefore, if the outlet port is plugged before the inlet port, a build-up of pressure within the sample loop will occur as the flow of the sample stream is shut off, but before the inlet valve becomes plugged. Thus, a sample at higher pressure and subsequent greater concentration of components per unit of volume is trapped within the sample

2 loop than an equal volume of sample at normal pressure contained within the sample volume. Also, even if the inlet and outlet valve ports from the sample loop closed simultaneously, there results a constant strain on the inlet port each time the inlet port closes and shuts off the sample flow from the sample line at process pressure.

Problems have also occurred when analyzing trace components that have been concentrated in a chromatographic column during the elution and development of the sample front through the column. These problems result from the fact that relatively large column diameter is needed to initially sorb the sample components, and it is then difficult to develop a uniform front through a column of large diameter when eluting the components therefrom. It has also been found that the concentration effect is enhanced in a small diameter column.

Also, the control of pressure fluctuations within the chromatographic system is of ever-increasing importance. For instance, it has been found that, when running large sample volumes through a chromatographic column, pressure drops through the column result as components are sorbed in the column. These pressure drops in turn effect the measured baseline from the sample detector. The resulting baseline shift or variation is highly undersirable in that it causes many sample peaks to be hidden or distorted and results in inaccurate quantitative determination of the sample stream.

Therefore, one object of this invention is to provide an improved method and apparatus for detecting trace components in fluid streams. Another object of this invention is to provide a novel method of and apparatus for developing fronts of concentrated trace components in chromatographic analysis operations. Another object of this invention is to provide a novel method of and apparatus for compensating flow upsets of a carrier gas stream to a detector in a chromatographic analysis operation. Other objects and advantages of this invention will be apparent from a study of the disclosure.

According to one embodiment of this invention, a continuous sample stream is taken from the process stream and run through a sample loop of a sample valve. The pressure through this sample stream is controlled by a back pressure regulator positioned downstream from the sample valve. The position of the pressure regulator downstream from the sample valve is advantageous in that it reduces the probability of any leakage from the stream or any contamination into the stream before entering the sample loop. A bypass around the sample valve is provided whereby the continuous sample stream will bypass the sample valve until the valve has been actuated and a sample volume is trapped within the sample loop. This bypass will divert the sample stream under the regulated process pressure from the sample valve and thereby reduce the likelihood of the valve being subjected to full process pressure in case of malfunction. This diversion will also assure that an accurate vaporous sample will be obtained even if the outlet port of the sample valve closes an instant before the inlet port closes.

According to another embodiment of this invention, a large sample (100 to 1000 cc.) is forced into a first chromatographic sorption zone in such quantity and manner that the major sample components entirely fill this first zone and overflow slightly into a second chromatographic sorption zone having a smaller cross sectional area than the first zone to thereby cause the trace sample components which were displaced to the front of the major components to become even more concentrated in a sharp zone of reduced cross sectional area. Carrier gas is then run through the first and second chromatographic sorption zones in series to elute the concentrated trace sample components through the remaining active portion of the second zone. An in-line detector is provided between the first and second columns for the purpose of determining the time of passage of the sorption front into the smaller diameter zone and for the purpose of determining that this front passed into the smaller diameter zone before any elution separation has occurred. If the major sample components are not sorbed on the column, the concentration of the sorbed trace components can be accomplished by the injection of a measured slug of displacer gas therein which is strongly sorbed by the column packing and thereby displaces the trace sample components from the first sorption zone past the in-line detector into the inlet end of the second sorption zone, the small diameter column. A carrier gas will then carry the displaced sample components through the second column and effect the separation of the components.

According to another embodiment of this invention, a flow restrictor is positioned upstream of the sample detector, and an outlet conduit controlled by a pressure regulator is positioned upstream of the restrictor so that a first portion of the carrier gas stream carrying the sample components to the detector is bled off upstream from the flow restrictor in response to a predetermined pressure set by the pressure regulator so that a second portion of the carrier gas stream carrying the sample components will flow through the flow restriction zone to the detector at a constant rate. This will prevent variations in the flow rate to the detector caused by upstream pressure variations as sample components are sorbed by the chromatographic columns, or for any other reason. A similar device can be provided for the reference carrier gas stream flowing to a reference detector so that a first portion of the reference carrier gas stream will be bled off in response to a predetermined pressure and a second portion will pass through a restrictor at a constant rate to a reference detector. In this manner, the flow variations of the carrier gas stream can be balanced by a differential measuring circuit, and thereby result in a more accurate measurement of the sample components. For optimum control both detectors upstream of their respective restrictors will be connected to the same back pressure regulator so that the pressure at both detectors will be identical and nearly constant.

This invention can be more easily understood from a study of the drawings in which FIGURE 1 is a schematic representation of the analyzer of this invention.

Figure 2:
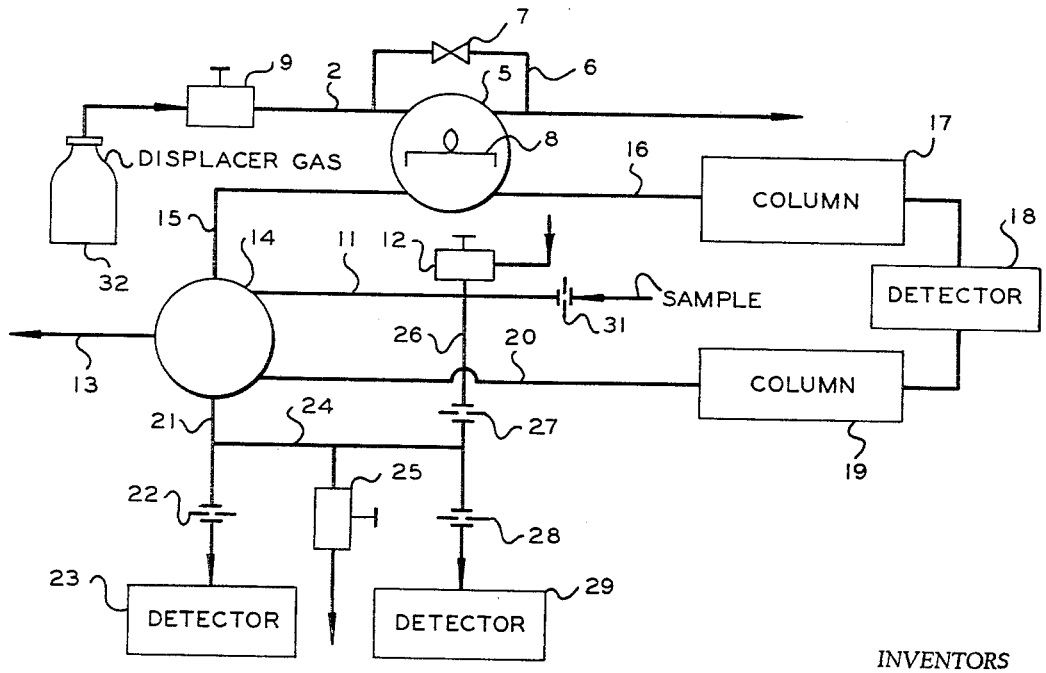

FIGURE 2 is a schematic representation of the analyzer of this invention which utilizes the displacer gas and a relatively non-sorbed sample gas.

Referring now to FIGURE 1, sample conduit 2, having valve 3 and restrictor 4 operatively connected therein, communicates with sample valve 5. Valve 5 can be the pneumatically operated valve mechanism disclosed in U.S. Patent 3,140,615. Bypass conduit, 6 having valve 7 operatively positioned therein, is connected to sample conduit 2 on either side of sample valve 5. Pressure regulator 9 is positioned in conduit 2 downstream of sample valve 5. Thus, when valve 3 is open, the sample stream containing the trace component or components to be analyzed will continuously flow to sample valve 5 from process 1 via conduit 2. When valve 7 is closed and sample valve 5 is in a first position, sample will flow from conduit 2 to sample valve 5 and through sample loop 8 therein, and then out conduit 2 through pressure regulator 9. When it is desired to take a sample, valve 7 is opened and sample valve 5 is placed in a second position to thereby trap a sample within sample loop 8 and allow this sample stream to simultaneously flow through conduit 6 and valve 7. Alternatively, valve 7 may be adjusted to serve as a constant restrictor with a greater restriction than that internal to valve 5, rather than as a shut-off valve. In this case, most of the flow will be through valve 5 except when during the switching of valve 5 its restriction increases. This restrictor will prevent excessive build-up of pressure in case valve 5 becomes plugged or otherwise inoperative.

Carrier gas is supplied via conduit 11 and is controlled by pressure regulator 12. Backflush valve 14 can be the same type of valve mechanism as sample valve 5. When valve 14 is in a first position and sample valve 5 is in said first position, carrier gas will flow through conduit 11, valve 14, conduit 15, valve 5, conduit 16, chromatographic column 17, in-line detector 18, chromatographic column 19 which has a smaller cross sectional area than column 17, conduit 20, back through valve 14, flow restrictor 22, and sample detector 23. A portion of the carrier gas stream will be bled off via conduit 24 in response to pressure regulator 25. Carrier gas will also flow through conduit 26 and restrictors 27 and 28 to reference detector 29. A portion of this reference carrier gas stream will also be bled off via conduit 24 in response to pressure regulator 25. Restrictor 27 will provide a pressure drop through the reference stream similar to the pressure drop of the carrier gas stream flowing through columns 17 and 19 so that the flow entering detectors 23 and 29 is approximately the same. It is within the scope of this invention to utilize this apparatus without the reference carrier gas stream. However, when the said reference carrier stream is utilized, and the sample and reference detectors are connected to a differential measuring or integration circuit, then the background noise to the detector caused by flow upsets can be eliminated and a more accurate detection of sample components can be made.

When sample valve 5 is placed in its second position and valve 14 remains in its first position, carrier gas will flow through sample loop 8 and carry sample constituents into chromatographic column 17 to begin the analysis cycle. The major components in the sample will entirely fill column 17 and overflow into column 19 which has a smaller cross sectional area than column 17. During this process, the lightly sorbed trace components within the sample will be displaced and thereby concentrated in the front of the major components. Consequently, when the displaced trace components enter column 19, they will become even more concentrated due to the reduced cross sectional area of column 19. In-line detector 18 will indicate when the sorption front enters column 19. Therefore, the displacement time of the concentrated trace components through column 19 can be easily determined.

When valve 14 is placed in its second position, carrier will flow from conduit 11 through valve 14 into conduit 20, chromatographic column 19, in-line detector 18, chromatographic column 17, conduit 16, sample valve 5, conduit 15, back to valve 14, and out vent line 13. Thus, when valve 14 is in its second position and valve 5 is in its first position, chromatographic columns 19 and 17 will be backflushed by carrier from conduit 11.

Detectors 23, 29, and 18 can either be thermistor type detectors or flame ionization type detectors. If a flame ionization type detector is used as in-line detector 18, a small stream of carrier gas containing eluted components from chromatographic column 17 will be passed through a small capillary conduit tube connected between chromatographic columns 17 and 19 to a flame ionization detector.

In order to describe the operation of the analyzer of this invention, reference will be made to a typical detection of oxygen impurities in an ethylene stream. Column 17 is approximately 6 feet in length and has a ⅜ inch internal diameter. The column is filled with a molecular sieve material (Linde) (40–60 mesh). Column 19 is approximately 8 feet long and ⅛ inch in diameter. Column 19 is again filled with molecular sieve material but of finer mesh (60–80 mesh). The ethylene sample gas from process 1 flows through conduit 2 into valve 5, sample loop 8, and out through pressure regulators 9, when sample valve 5 is in its first position. Valve 7 is then opened and valve 5 is placed in its second position to thereby trap 600 cc. of sample gas within loop 8. Valve 14 is in its first position and hydrogen carrier gas then flows through conduit 11, valve 14, conduit 15, and through sample loop 8 into conduit 16, thereby carrying the trapped sample components into chromatographic column 17. Carrier continues to flow into conduit 16 for one minute until in-line detector 18 indicates that a front of ethylene from chromatographic column 17 is passed therethrough and into chromatographic column 19. The carrier gas pressure during this time is maintained at 15 p.s.i.g. Detector 18 is a thermistor detector and detectors 23 and 29 are thermistor members of the Wheatstone bridge. The vent lines from detectors 23 and 29 are maintained at atmospheric pressure and the back pressure regulator 25 is preset at ½ p.s.i.a. One-half minute after the oxygen has entered chromatographic column 19, its concentration is indicated by detector 23. Sample valve 5 is then placed in its first position and valve 14 is placed in its second position and carrier gas is allowed to backflush columns 19 and 17 for 8 minutes. The analysis cycle can now be repeated.

Now referring to FIGURE 2, which is a schematic diagram of the apparatus of this invention which is used to measure-low concentration impurities in an essentially non-sorbed sample, the hardware and operation is essentially the same as in FIGURE 1 except displacer gas cylinder 32 is substituted for process gas 1, pressure regulator 9 may be inserted within conduit 2 between displacer gas cylinder 32 and valve 5, and variable flow restrictor 31 and back pressure regulator 12 are connected to conduit 11. As an alternative, the displacer gas system may be identical to that shown in FIGURE 1 for the sample gas. By utilizing this embodiment, the sample from conduit 11 is utilized as a sample gas, carrier gas, and backflushing gas. When valve 14 is in its second position and valve 5 is in its first position, sample gas will flow through conduits 20, chromatographic column 19, in-line detector 18, chromatographic column 17, conduit 16, valve 8, conduit 15, back through valve 14, and out vent line 13 in a similar manner as did the carrier gas in FIGURE 1. Variable flow restrictor 31 controls the rate of sample flow through the system or, if used in conjunction with back pressure regulator 12, controls the inlet pressure constant. Thus, when the sample flows through the system as described for a predetermined rate and a predetermined time, columns 17 and 19 will thereby become equilibrated by the trace component of interest in the non-adsorbed sample gas. When valve 5 is placed in a second position, displacer will be trapped within sample loop 8, and when valve 14 is placed in its first position, sample will thereby push displacer gas from sample loop 8 into chromatographic column 17. Valve 14 must be in its first position coincident with or preceding placing valve 5 in its second position. The displacer is then strongly sorbed on column 17 and displaces the trace components from the sorbent into column 19. Trace components are then eluted through column 19 by the sample gas. Therefore, it can readily be seen that this operation will proceed in a similar manner as the operation of the apparatus as described in FIGURE 1. After elution of components from chromatographic column 19 in concentrated form to detector 23, the sample gas will again backflush through 19 and 17. It is preferred that a partial or incomplete backflush in a programmed cycle be utilized so that a stable and reproducible equilibrium can be achieved in a minimum time. When utilizing the incomplete backflush on a programmed cycle, column 17 will remain partially deactivated after backflush but sufficient activity remains to provide for the sorption of the trace components. This method of partial backflush speeds up the operation of the analyzer and permits more frequent analysis.

In order to describe the operation of the analyzer of FIGURE 2, reference will be made to the typical detection of nitrogen and oxygen impurities in a helium stream. The nitrogen and oxygen impurities are present in a concentration as low as 100 parts per billion. Columns 17 and 19 and detectors 18, 23, and 29 are the same as described in FIGURE 1. The helium sample is introduced into conduit 11 at the rate of from 50 to 100 cc. per minute for several minutes. The valves are so positioned that the sample gas flows through conduits 20, chromatographic column 19, detector 18, chromatographic column 17, conduit 16, valve 5, conduit 15, back to valve 14, and out vent line 13 when valve 14 is placed in its first position. During this time, ethylene, which is used as the displacer gas, is flowing from conduit 2 and through sample loop 8 in valve 5. Valve 14 is then changed to its second position and valve 5 to its second position to trap 600 cc. of ethylene in sample loop 8 and to allow the helium sample to flush the ethylene displacer from sample loop 8 into chromatographic column 17. The sample helium then flows forward through chromatographic columns 17 and 19 at a rate from 50 to 100 cc. per minute. After 1 minute, in-line detector 18 indicates the trace components have passed to chromatographic column 19. The elution time for the nitrogen and oxygen trace components through chromatographic column 19 will vary with the temperature of column 19 and will be from about 2 to 3 minutes. Thus, the cycle is completed and a new cycle can be begun.

We claim:

1. A chromatographic apparatus comprising, a measuring valve means; a first conduit means communicating with said measuring valve means; a second conduit means communicating with said measuring valve means and having a pressure regulating means positioned therein; a third conduit connected between said first conduit means and said second conduit means; a valve positioned in said third conduit means; a fourth conduit means connected to said measuring valve means; a fifth conduit means connected to said measuring valve means, said measuring valve means being connected so that in a first measuring valve position, there is direct communication between said fourth conduit means and said fifth conduit means and communication through a trapping area between said first conduit means and said second conduit means, and in a second measuring valve position there is communication through said trapping area between said fourth conduit means and said fifth conduit means; first chromatographic column means connected to said fifth conduit means; second chromatographic column means having a smaller diameter than said first chromatographic column means; sixth conduit means connecting said first and second chromatographic column means; in-line detector means positioned within said sixth conduit means; operating valve means connected to said fourth conduit means; seventh conduit means connecting said operating valve means and said second chromatographic column means; exhaust conduit means connected to said operating valve means; inlet conduit means connected to said operating valve means; flow restriction means located within said inlet conduit means; sample detector means; eighth conduit means connecting said operating valve means and said detector means; flow restriction means positioned within said eighth conduit means; ninth conduit means connecting said eighth conduit means at a point upstream of said flow restriction means; said ninth conduit means having a pressure regulating means positioned therein, and said operating valve means being connected so that in a first operating valve position said fourth conduit means communicates with said exhaust conduit means and said inlet conduit means communicates with said seventh conduit means and so that in a second operating valve position said fourth conduit means communicates with said inlet conduit means and said seventh conduit means communicates with said eighth conduit means, said apparatus being adapted to have either a first sample source or a displacer gas source connected to said first conduit means and either a carrier gas source or a second sample source connected to said inlet conduit means, said first sample source and said carrier gas source being connected in a first operation and said displacer gas source and said second sample source being connected in a second operation.

2. The apparatus of claim 1 further comprising, a reference detector means; tenth conduit means connecting said inlet conduit means and said reference detector means; flow restriction means positioned within said tenth conduit means; and eleventh conduit means connecting said tenth conduit means at a point upstream of said flow restriction means to said ninth conduit means at a point upstream of said pressure regulating means positioned therein.

3. A method of analyzing constituents in a fluid stream comprising:
  (a) equilibrating a first chromatographic sorption zone with sample constituents from said fluid stream by introducing a predetermined amount of said sample constituents into said first sorption zone;
  (b) displacing at least a portion of said sample constituents from said first chromatographic sorption zone to a second chromatographic sorption zone by introducing a predetermined amount of displacer gas into said first chromatographic sorption zone;
  (c) passing a predetermined amount of a carrier gas stream through said second chromatographic sorption zone to elute the displaced sample constituents therefrom; and
  (d) passing at least a portion of the eluted constituents to a detection zone wherein measurement of the displaced portion of the sample provides a signal representative of the proportionate amount of the displaced sample components present in said fluid stream.

4. The method of claim 3 wherein said displaced sample constituents are displaced to a second chromatographic sorption zone having a smaller cross-sectional area than said first chromatographic sorption zone.

5. The method of claim 4 wherein said fluid stream is used as said carrier gas stream.

6. A method of analyzing constituents in a fluid stream comprising:
  (a) passing a predetermined amount of a sample stream consecutively through a second chromatographic column and a first chromatographic column of larger diameter than said second column in order to reach a preselected point of equilibrium;
  (b) reversing the direction of flow through said chromatographic columns by introducing said sample stream into said first column at the end opposite its connection to said second column;
  (c) isolating a precise volume of displacer gas at a pressure which is regulatively controlled at a predetermined value which is less than the pressure of said displacer gas at its source;
  (d) introducing, simultaneously with said flow reversal, said precisely measured amount of displacer gas into said sample stream;
  (e) passing said displacer gas into said first and second chromatographic columns in order to displace and concentrate the particular trace components of said sample stream to be analyzed, said trace components having been sorbed when said sample stream was passed through said columns in a direction opposite to the direction of flow of said displacer gas;
  (f) continuing passage of said sample stream through said first and second columns in order to further concentrate said trace components and carry them through said columns;
  (g) splitting the stream leaving said second chromatographic column into two streams, one of which is vented through a constant pressure device and the other of which flows through a flow restriction device so that constant pressure downstream of said flow restriction device is maintained; and
  (h) introducing the constant pressure fluid leaving said flow restriction device into chromatographic detection means to establish a signal representative of the portion of the analyzed element present in the sample material.

References Cited

UNITED STATES PATENTS

| | | | |
|---|---|---|---|
| 3,097,518 | 7/1968 | Taylor et al. | 73—23.1 XR |
| 3,330,150 | 7/1967 | Loyd et al. | 73—23.1 |
| 2,398,818 | 4/1946 | Turner | 73—23.1 |
| 3,126,732 | 3/1964 | Sanford | 73—23 |
| 3,168,823 | 2/1965 | Reinecke et al. | 73—23.1 |
| 3,186,234 | 6/1965 | Solnick et al. | 73—422 |
| 3,240,052 | 3/1966 | Reinecke et al. | 73—23.1 |
| 3,345,859 | 10/1967 | Fenske | 73—23.1 |
| 3,077,766 | 2/1963 | Reinecke | 73—23 |

OTHER REFERENCES

"1966 Columns and Accessories for Chemical Instrumentataion," Hewlett Packard.

RICHARD C. QUEISSER, Primary Examiner

V. J. TOTH, Assistant Examiner